United States Patent
Callewaert et al.

(10) Patent No.: US 11,520,488 B2
(45) Date of Patent: Dec. 6, 2022

(54) METHOD AND APPARATUS FOR IDENTIFYING A DEVICE MISSING FROM A CONSISTENCY GROUP

(71) Applicant: EMC IP HOLDING COMPANY LLC, Hopkinton, MA (US)

(72) Inventors: Peter Callewaert, Puurs-Sint-Amands (BE); Dennis Trulli, Jr., Littleton, MA (US)

(73) Assignee: Dell Products, L.P., Hopkinton, MA (US)

( * ) Notice: Subject to any disclaimer, the term of this patent is extended or adjusted under 35 U.S.C. 154(b) by 72 days.

(21) Appl. No.: 16/855,315

(22) Filed: Apr. 22, 2020

(65) Prior Publication Data

US 2021/0334013 A1  Oct. 28, 2021

(51) Int. Cl.
*G06F 12/00* (2006.01)
*G06F 3/06* (2006.01)
*G06K 9/62* (2022.01)

(52) U.S. Cl.
CPC .......... *G06F 3/0619* (2013.01); *G06F 3/0653* (2013.01); *G06F 3/0659* (2013.01); *G06F 3/0683* (2013.01); *G06K 9/6256* (2013.01)

(58) Field of Classification Search
CPC .... G06F 3/0619; G06F 3/0653; G06F 3/0659; G06F 3/0683
USPC ........................................................ 711/154
See application file for complete search history.

(56) References Cited

U.S. PATENT DOCUMENTS

| | | | | |
|---|---|---|---|---|
| 5,682,513 A | * | 10/1997 | Candelaria | G06F 11/2074 711/113 |
| 8,433,863 B1 | * | 4/2013 | Orcutt | G06F 11/1458 711/170 |
| 8,583,838 B1 | * | 11/2013 | Marshak | G06F 3/0689 710/16 |
| 10,009,360 B1 | * | 6/2018 | Todd | H04L 63/145 |
| 10,346,610 B1 | * | 7/2019 | Natanzon | G06F 3/0619 |
| 2002/0129040 A1 | * | 9/2002 | Frey | G06F 11/2064 |
| 2005/0160248 A1 | * | 7/2005 | Yamagami | G06F 3/065 711/170 |
| 2007/0118605 A1 | * | 5/2007 | Yamada | G06F 11/2097 709/214 |
| 2012/0089877 A1 | * | 4/2012 | Takeuchi | G06F 3/0659 714/719 |
| 2013/0282955 A1 | * | 10/2013 | Parker | G06F 12/0246 711/E12.008 |

(Continued)

*Primary Examiner* — Mohamed M Gebril
(74) *Attorney, Agent, or Firm* — Anderson Gorecki LLP (57) ABSTRACT

A consistency group is defined to include a set of required devices on a set of storage systems. Write patterns on each of the required devices are monitored and write patterns on each of the other devices on the set of storage systems is monitored. Pairs of devices are formed, in which each pair includes one required device and one other device. Write patterns of the pairs of devices are compared to determine respective percentage coordinated write probabilities for pairs of devices. Write patterns of the pairs of devices are also compared to determine ratios of write operations for pairs of devices. A coordinate write probability above a threshold, or a determined ratio of write operations that occurs sufficiently frequently, is interpreted as an indication that one of the other devices should be included in the consistency group. A learning process is trained and used to analyze the write patterns.

19 Claims, 8 Drawing Sheets

(56) References Cited

U.S. PATENT DOCUMENTS

| | | | |
|---|---|---|---|
| 2014/0025796 A1* | 1/2014 | Vibhor | H04L 67/1097 |
| | | | 709/222 |
| 2015/0134905 A1* | 5/2015 | Oe | G06F 3/0608 |
| | | | 711/114 |
| 2015/0186787 A1* | 7/2015 | Kumar | G06Q 10/107 |
| | | | 707/758 |
| 2017/0019836 A1* | 1/2017 | Bird | H04L 47/624 |
| 2017/0192682 A1* | 7/2017 | Atia | G06F 3/067 |
| 2017/0351574 A1* | 12/2017 | Dubucq | G06F 3/0619 |
| 2018/0143994 A1* | 5/2018 | Ohtsuji | G06F 3/0611 |
| 2019/0303032 A1* | 10/2019 | Kim | G06F 3/0635 |
| 2019/0332317 A1* | 10/2019 | Danielson | G06F 3/0631 |
| 2019/0361611 A1* | 11/2019 | Hosogi | G06F 12/02 |
| 2020/0081642 A1* | 3/2020 | Brown | G06F 3/0604 |
| 2020/0242171 A1* | 7/2020 | Pogrebezky | G06F 16/951 |
| 2020/0252289 A1* | 8/2020 | Nelson | H04L 63/104 |
| 2021/0232596 A1* | 7/2021 | Qi | G06N 20/00 |

* cited by examiner

| Device Activity Data Structure 310 | |
|---|---|
| Device IN #1 | Number of Writes |
| Device IN #2 | Number of Writes |
| ● ● ● | |
| Device IN #m | Number of Writes |
| Device OUT #1 | Number of Writes |
| Device OUT #2 | Number of Writes |
| ● ● ● | |
| Device OUT #n | Number of Writes |

400

Devices In Consistency Group

Devices Not In Consistency Group

| | Device Pairing Data Structure 320 ,500 | | | |
|---|---|---|---|---|
| Row 1 560 | Device IN #1 (In consistency group) | | Device OUT #1 (Not in consistency group) | |
| | Storage System ID 600 | Device ID 605 | Storage System ID 610 | Device ID 615 |
| | Number of times both updated 620 | | Number of times one updated 625 | |
| | Coordinated Write Probability Percentage 628 | | | |
| | Ratio 1 630 | Count 1 635 | | Interval 1 640 |
| | Ratio 2 | Count 2 | | Interval 2 |
| | ⋮ | ⋮ | | ⋮ |
| | Ratio n | Count n | | Interval n |
| Row 2 | Device IN #1 (In consistency group) | | Device OUT #2 (Not in consistency group) | |
| | Storage System ID | Device ID | Storage System ID | Device ID |
| | Number of times both updated | | Number of times one updated | |
| | Coordinated Write Probability Percentage 628 | | | |
| | Ratio 1 | Count 1 | | Interval 1 |
| | Ratio 2 | Count 2 | | Interval 2 |
| | ⋮ | ⋮ | | ⋮ |
| | Ratio n | Count n | | Interval n |
| | ⋮ | | | |
| | Row z 500 | | | |

FIG. 8

METHOD AND APPARATUS FOR IDENTIFYING A DEVICE MISSING FROM A CONSISTENCY GROUP

FIELD

This disclosure relates to computing systems and related devices and methods, and, more particularly, to a method and apparatus for identifying a device missing from a consistency group.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A consistency group is defined to include a set of required devices on a set of storage systems. Write patterns on each of the required devices are monitored and write patterns on each of the other devices on the set of storage systems is monitored. Pairs of devices are formed, in which each pair includes one required device and one other device. Write patterns of the pairs of devices are compared to determine respective percentage coordinated write probabilities for pairs of devices. Write patterns of the pairs of devices are also compared to determine ratios of write operations for pairs of devices. A coordinate write probability above a threshold, or a determined ratio of write operations that occurs sufficiently frequently, is interpreted as an indication that one of the other devices should be included in the consistency group. A learning process is trained and used to analyze the write patterns.

DETAILED DESCRIPTION

Figure 1:
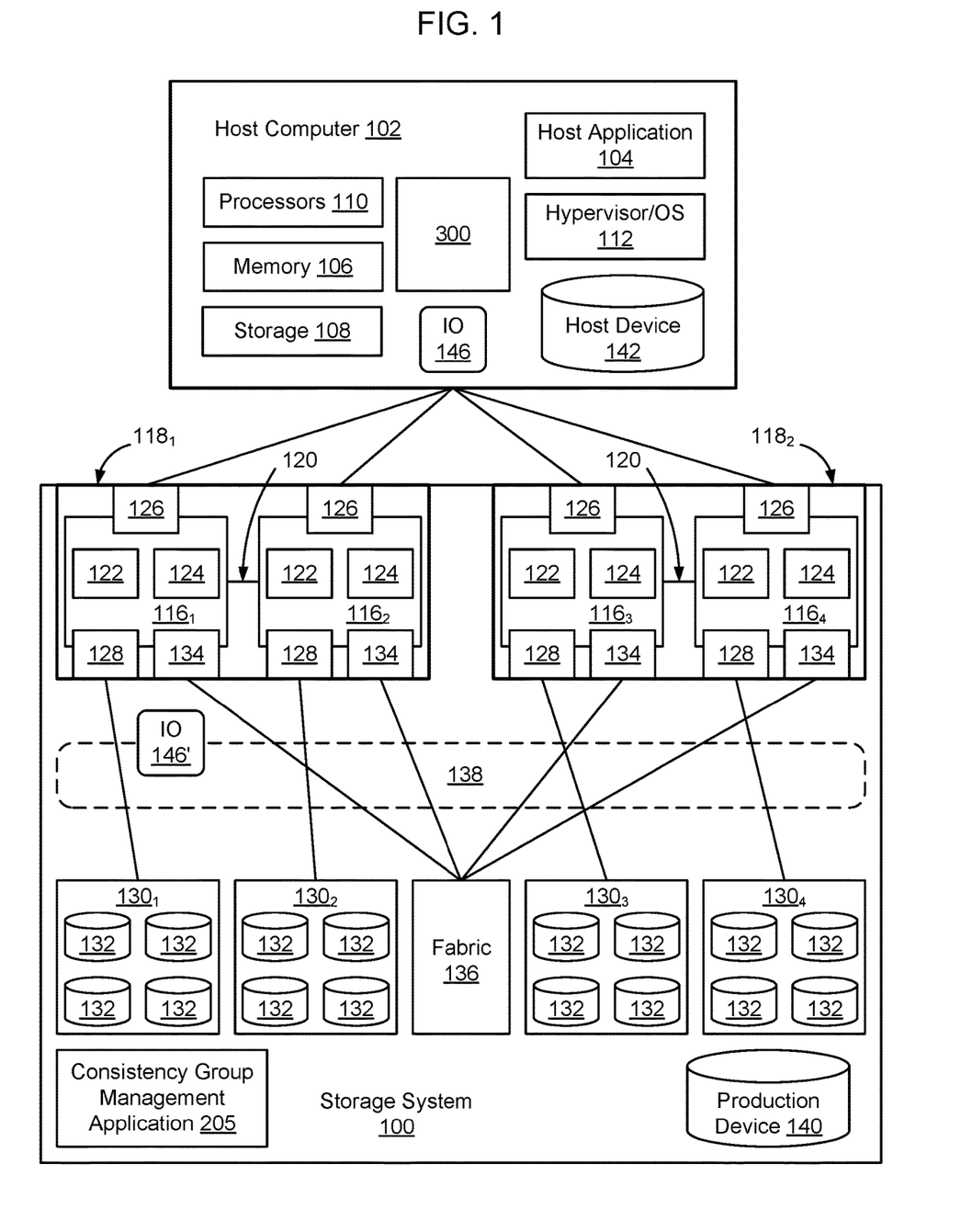
FIG. 1 is a functional block diagram of an example storage system connected to a host computer, according to some embodiments.

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe bus, or may be connected to the compute nodes $116_1$-$116_4$, for example, by an IB (InfiniBand) bus or fabric.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

Figure 2:
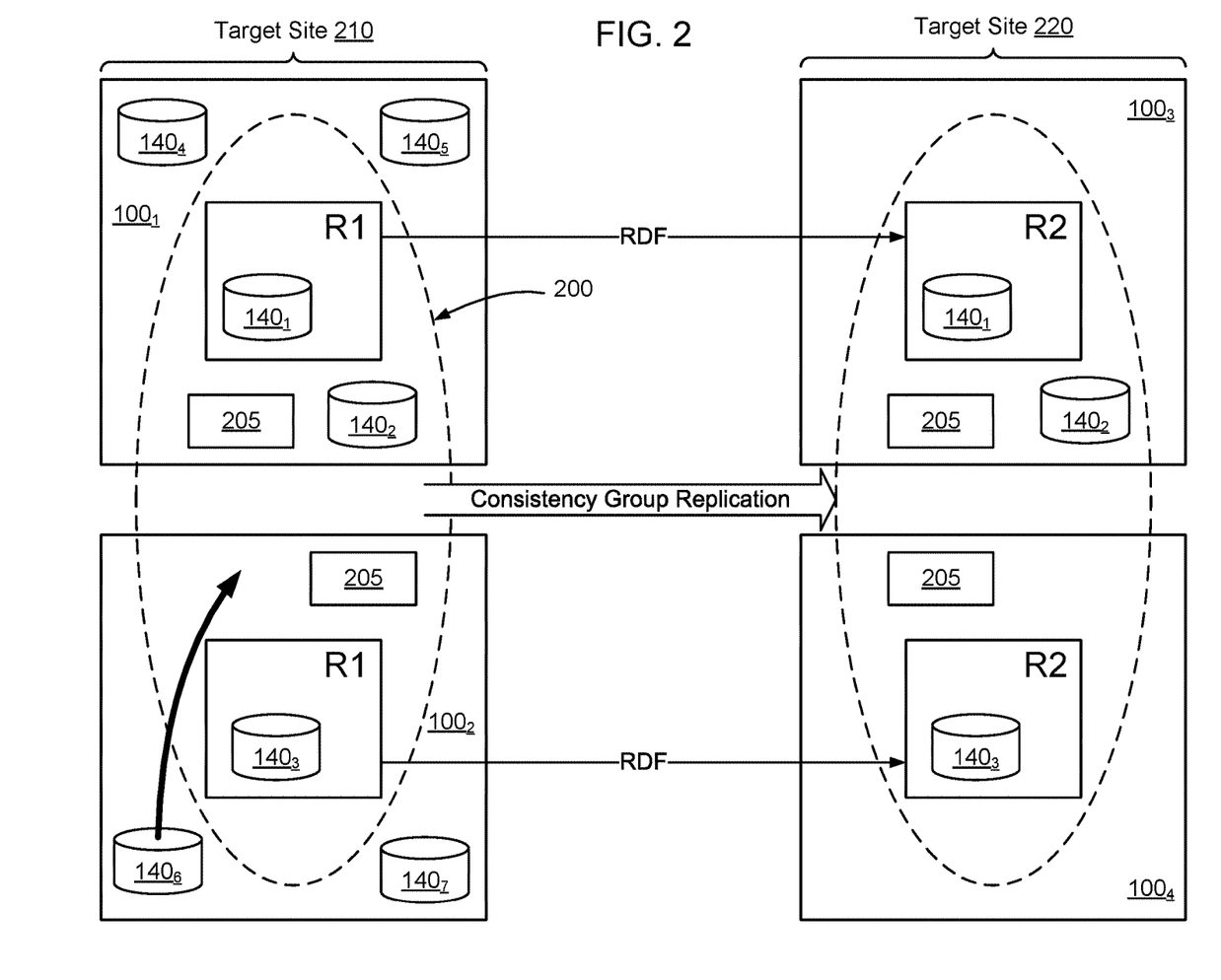
FIG. 2 is a functional block diagram of a set of storage systems having a group of devices forming a consistency group, according to some embodiments.

FIG. 2 is a functional block diagram of a set of storage systems having a group of devices 140 forming a consistency group 200, according to some embodiments. As used herein, the term "consistency group" is a logical collection of devices 140 on a single storage system or on a group of storage systems at a single geographical location. Although FIG. 2 shows a consistency group 200 including devices 140 in two storage systems 100, devices in the consistency group 200 may be on other numbers of storage systems 100, such as a single storage system 100 or multiple storage systems 100.

All devices 140 associated with a consistency group 200 are protected using a consistency group management application 205. The consistency group management application 205 prevents loss or corruption of data when there is a communications failure or device failure in configurations of single or multiple storage systems at the source site 210 or target site 220, by ensuring consistency of dependent write operations on the set of devices 140. Specifically, the consistency group management application 205 ensures that a dependent write cannot be done before the write it is dependent on has been acknowledged by the storage system 100. Thus, if remote replication is interrupted on one or more of the devices 140 in the consistency group 200, the consistency group management application 205 will step in to prevent remote replication for all devices 140 in the consistency group 200 in such a way that no dependent write is remotely replicated if a write that it depends on is not replicated. In this manner, the consistency group management application ensures logically consistent, restartable data copies at the remote side of the configuration. As used herein, the term "device 140" includes production devices as shown in FIG. 1 as well as collections of production devices 140 that may be organized in reproduction groups (R1 volumes).

Many applications, particularly transaction-oriented systems or database management systems, use dependent write logic for data consistency. Dependent write logic means that an attempt by an application to issue a given IO request depends on the prior successful completion of another IO operation. When a write operation occurs, the write operation may involve several dependent write steps. For example, a single write operation may include (1) writing a record of what the storage system is going to do to a transaction log; (2) writing the data to the actual database; and (3) writing another record to the transaction log to indicate that the data was updated successfully. In this example, the three writes (log, database update, and log again) are related such that each write request is not issued until the previous related write has completed.

When a consistency group 200 is defined, it is possible that one or more devices 140 are inadvertently not included in the consistency group 200. For example, as shown in FIG. 2, assume consistency group 200 has been defined and is being managed by a consistency group management application 205. For example, if device 1406 contains a log file associated with device 1402, it would be preferable to include device 1406 in the consistency group 200.

Remote replication of the devices is handled by the storage systems 100, and, once a consistency group 200 has been defined, the consistency group management application 205 ensures that dependent write logic is enforced within the devices 140 of the consistency group 200. In the example consistency group shown in FIG. 2, for example, the consistency group management application 205 ensures that dependent write operations on devices 1401, 1402, 1403, occur and are replicated to the target site 220 in such a way to preserve the dependent write logic implemented by the host application that is performing IOs on the storage systems.

Write operations on devices 140 that are not included in the consistency group 200, such as devices 1404, 1405, 1406, are not managed by the consistency group management application 205. If a required device is not included in the consistency group 200, such as device 1406, the consistency group management application 205 will not prevent writes on that device from occurring when write operations are stopped on the devices that are included in the consistency group 200.

This can be problematic and make it difficult or impossible for failover to target site 220 to occur. Specifically, in the event of a failure, the consistency group management application 205 stops write operations on all devices 140 of the consistency group 200, to preserve dependent write logic across the set of devices 140 within the consistency group 200. If the dependent write logic requires write operations to be performed on a device that is not part of the consistency group 200, the consistency group management application 205 will not stop continued writes on that device 140 in the event of a failure. As a result, not including a required device 140 in a consistency group 200 can cause data to be present on the target site 220 that should not be there, making it impossible for the business to be restarted on the target site 220.

According to some embodiments, a learning process 325 is trained to look for write patterns indicative of dependent write operations. The trained learning process 325 is then deployed to watch write patterns on a set of storage systems to identify devices 140 that should have been included in a consistency group 200.

Figure 3:
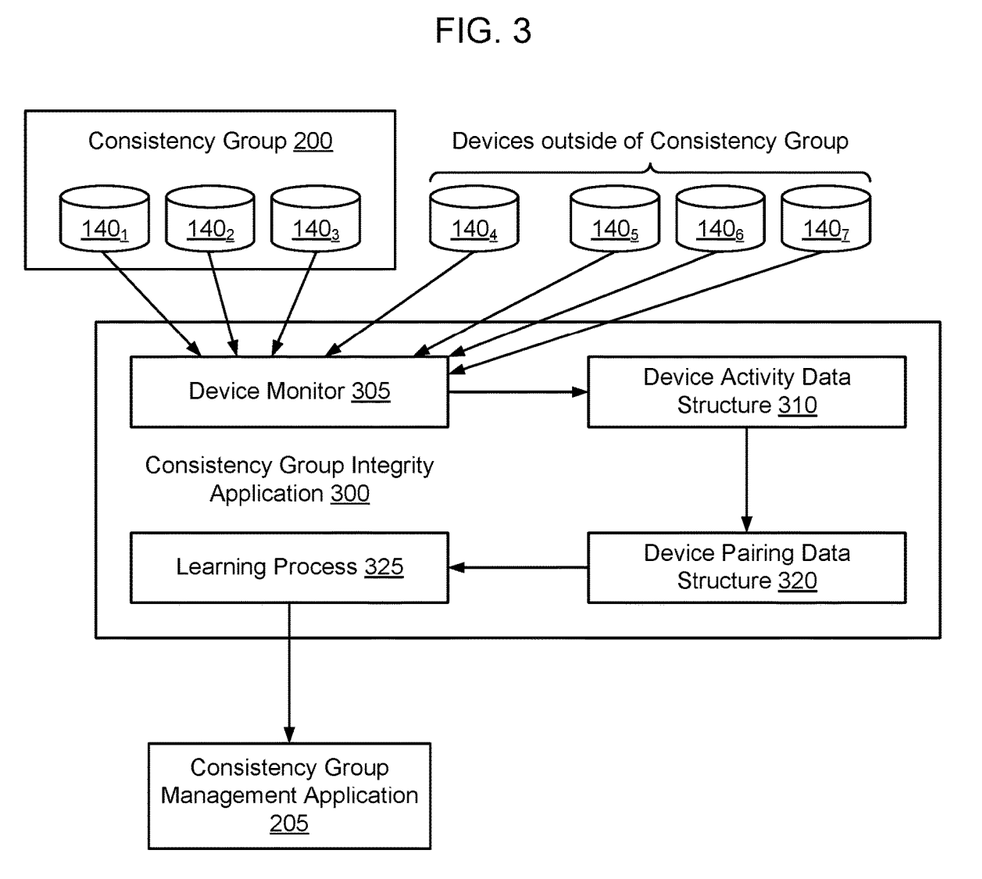
FIG. 3 is a functional block diagram of a storage environment including a consistency group integrity application configured to monitor device activity to identify devices missing from a consistency group, according to some embodiments.

FIG. 3 is a functional block diagram of a storage environment including a consistency group integrity application 300 configured to monitor device activity to identify devices 140 missing from a consistency group 200, according to some embodiments. The components may be implemented as a host application 104 on host 102 or in another manner.

As shown in FIG. 3, in some embodiments devices 140 are divided into two classes. A first class of devices 140 includes devices 140 contained inside a consistency group 200 (devices 140$_1$, 140$_2$, 140$_3$), and a second class of devices 140 includes all other devices 140 that are outside of the consistency group 200 (devices 140$_4$, 140$_5$, 140$_6$, and 140$_7$). As noted above, the devices 140 may be physically hosted by one or more storage systems 100 at a given site (data center). Although only seven devices 140 are shown for ease of explanation, the set of storage systems 100 may have on the order of thousands of devices 140. A given consistency group 200 may have on the order of a thousand devices 140 and, likewise, there may be on the order of a thousand or more devices 140 that are not included in the consistency group 200.

As noted above, when defining a consistency group 200, customers sometimes miss some devices 140 that should be included in the consistency group 200. According to some embodiments, the consistency group integrity application 300 is configured to monitor write operations to devices 140 inside and outside of the consistency group 200, to look for write patterns indicative of dependent write operations. If a write pattern is detected that indicates the presence of a dependent write to a device 140 outside of a consistency group 200, the consistency group integrity application 300 either automatically instructs the consistency group management application 205 to include the device 140 in the consistency group 200 or provides an alert (e.g. via the consistency group management application 205) indicating that the device 140 should be considered for inclusion in the consistency group 200.

In some embodiments, the consistency group integrity application 300 has a device monitor 305 configured to monitor write operations to the devices 140. The device monitor 305 monitors the number of write IOs to all devices 140 on all connected controllers. Each interval, this data is aggregated into a single table containing the number of updates for each device 140 during that interval. In FIG. 3, the consistency group integrity application 300 includes device 140 activity data structure 310 that is used to store the aggregated write information. Device activity data structure 310 is described in greater detail below in connection with FIG. 4.

The consistency group integrity application 300 obtains consistency group 200 definitions from a consistency group management application 205 and creates a device pairing data structure 320. The device pairing data structure 320 is described in greater detail below in connection with FIGS. 5-6. The device pairing data structure 320 uses aggregated write information from the device activity data structure 310 and organizes the aggregated write information and processes the aggregated write information to enable write operations to be evaluated within a current interval and over time. This enables write operations on each device 140 in the consistency group 200 to be compared to write operations on each device 140 outside of the consistency group 200. Where write patterns are detected between a pair of devices 140 (one inside consistency group 200 and one device 140 outside of the consistency group 200), the device 140 outside of the consistency group 200 is a candidate device 140 to be added by the consistency group management application 205 to the consistency group 200.

In some embodiments, a learning process 325 is used to look for patterns in the write operations. A process of training the learning process 325 to learn write patterns indicative of a device 140 that has been incorrectly not included in a consistency group 200 is described below in greater detail in connection with FIGS. 7-8. In some embodiments, the learning process 325 is a deep neural network learning process, although other recursive learning processes or classification learning processes may be used depending on the implementation.

Figure 4:
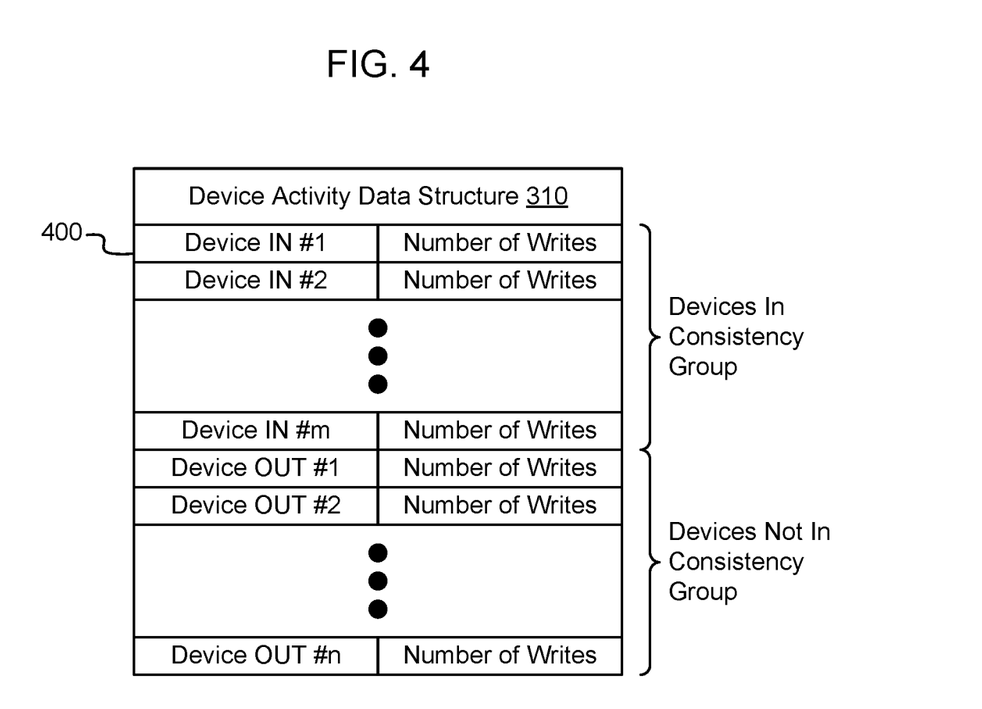
FIG. 4 is a functional block diagram of an example device activity data structure for use in the consistency group integrity application of FIG. 3, according to some embodiments.

FIG. 4 is a functional block diagram of an example device activity data structure 310. As shown in FIG. 4, in some embodiments, the device activity data structure 310 is a table having a row 400 for each device 140 on the set of storage systems 100 on which the consistency group 200 is defined. In some embodiments, the device activity data structure 310 includes an entry for each device that is part of the consistency group 200 and an entry for each device that is not part of the consistency group. Although the example device activity data structure 310 is shown in FIG. 4 as a table, other data structures may similarly be used.

The device activity data structure 310, in some embodiments, includes aggregated write activity for each individual device, in the form of the number of write operations that occurred on the device 140 during the interval. An example interval length may be five minutes, but other interval lengths could be used as well. The write activity may be detected by the device monitor 305 by looking at the system call data on each device 140, or may be collected in other ways depending on the implementation.

Figure 5:
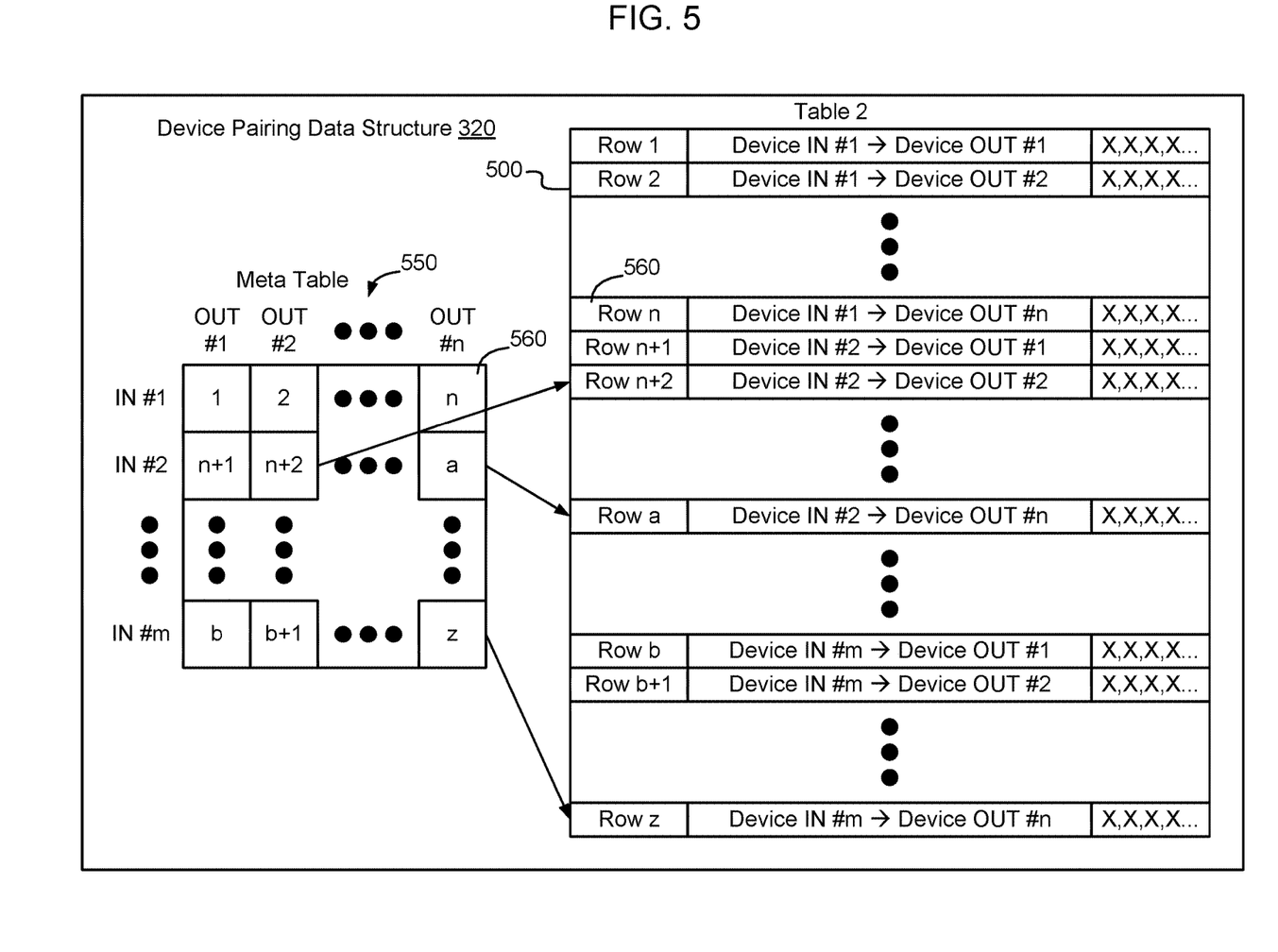
FIG. 5 is a functional block diagram of an example device pairing data structure for use in the consistency group integrity application of FIG. 3, according to some embodiments.
Figure 6:
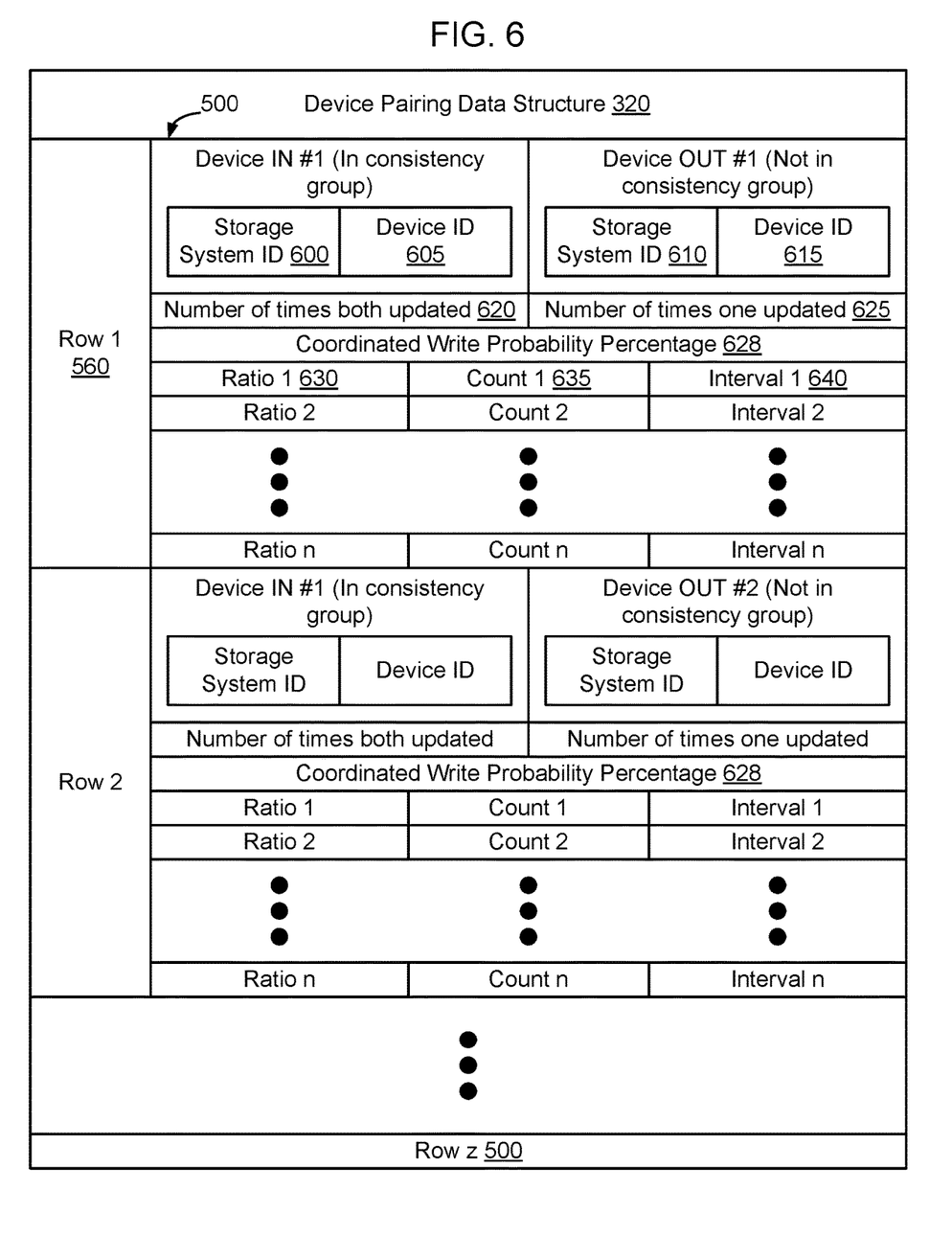
FIG. 6 is a functional block diagram of a portion of the example device pairing data structure of FIG. 5 in greater detail, according to some embodiments.

FIG. 5 is a functional block diagram of an example device pairing data structure 320, and FIG. 6 shows several entries of the example device pairing data structure 320 in greater detail. As shown in FIG. 5, in some embodiments the device pairing data structure 320 is a table, having a row for every possible pair of devices 140, where one device 140 is inside the consistency group 200 and one device 140 is outside the consistency group 200. For example, in FIG. 5, Row 1 is created for device IN #1 and device OUT #1. Row 2 is created for device IN #1 and device OUT #2. Row n of device pairing data structure 320 is associated with device IN #1 and device OUT #n. In this manner, device pairing data structure 320 includes one row for every possible pairing of devices 140, in which each pair includes one device 140 that is inside the consistency group 200 and one device 140 is outside of the consistency group 200. Although the example device pairing data structure 320 shown in FIG. 5 is illustrated as a table, other data structure types may be used to implement the device pairing data structure 320.

As shown in FIG. 6, in some embodiments, each row of the device pairing data structure 320 includes information about the devices 140, such as the storage system ID 600 and the device ID 605 of the device 140 that is included in the consistency group 200, and the storage system ID 610 and device ID 615 of the device 140 that is not included in the consistency group 200. Including the storage system ID enables the device 140 to be identified on the particular storage system where the consistency group 200 includes devices 140 on multiple storage systems.

Each row 500 of the device pairing data structure 320 includes a first field containing a value indicating the number of times both devices 140 associated with the row are updated 620, and the number of times 625 that only one device 140 associated with the row is updated. After a number of intervals, a coordinated write probability percentage 628 is calculated, which indicates the percentage of the time that both devices of the row were written to in the same interval. In some embodiments, the coordinated write probability is calculated as P=(number of intervals both devices are written to/number of intervals where one device was written to plus the number of intervals where both devices were written to). A high percentage value in a coordinated write probability 628 could indicate a possible write dependency between the devices 140 of that row, as this means that these two devices 140 are often updated together.

In addition, each interval, for each device 140 pair in the device pairing data structure 320, the consistency group integrity application 300 calculates a ratio 630 of the number of updates to the device 140 inside of the consistency group 200 over the number of updates to the device 140 outside of the consistency group 200. Depending on the implementation, a number of ratios 630 may be tracked in the device pairing data structure 320. For each ratio 630, the device pairing data structure 320 keeps track of the number of intervals 635 in which that ratio 630 was seen, and the last interval 640 for which the ratio was seen. If a tracked ratio is no longer seen after a predetermined number of intervals, it is removed from the table. When a new ratio is seen for a given device 140 pair, it is inserted into the table if there is an open slot or would replace an older ratio if that older ratio was seen only once. After a predetermined number of intervals, the device pairing data structure 320 will contain ratios that occur the most often for each device 140 pair. A ratio that is seen a large number of times for a given device 140 pair could indicate possible write dependence, as this means that the two devices 140 are often updated in a similar pattern.

In some embodiments, the device pairing data structure 320 is updated in each interval. In some embodiments, all entries of the device pairing data structure 320 are updated in each interval. In some embodiments, only entries associated with devices 140 that had write activity during the interval are updated. For example, as described above, the device 140 activity data structure 310 in some embodiments contains aggregated write information that occurred on each device 140 during the preceding interval. If a device 140 has write activity, the corresponding row 500 of the data activity data structure 310 is updated. This updated information then needs to be used to update the rows of the device pairing data structure 320.

Since a particular device may appear in multiple rows of the device pairing data structure 320, in some embodiments, to enable the rows of the device pairing data structure 320 to be quickly identified, the device pairing data structure 320 has a meta table 550 in which the rows are the device IDs of the devices 140 that are contained in the consistency group 200, the columns are the device IDs of the devices 140 that are not contained in the consistency group 200, and the entries are the row IDs 560 of the rows 500 of the device pairing data structure 320. If the device 140 activity data structure 310 indicates that write activity occurred on a particular device, the meta data structure 550 can be used to quickly identify the set of row IDs associated with the device, to enable the device pairing data structure 320 to be quickly updated. For example, if there is write activity to device ID OUT #n, by reading the entries in column #n of the Meta Table 550, it is possible to quickly identify each of the rows 500 of the entries of the device pairing data structure 320 that need to be updated. Although a particular meta data structure 550 was shown in FIG. 5, other ways of locating relevant rows of the device pairing data structure 320 may likewise be used depending on the implementation.

As discussed in greater detail herein, in some embodiments one of the host applications 104 is a consistency group integrity application 300 associated with a learning process 325. Although FIG. 3 shows both the consistency group integrity application 300 and learning process 325 implemented on the same host 104, in other embodiments the two processes may be implemented on separate hosts 104.

In some embodiments, the consistency group integrity application 300 receives collections of information about operational characteristics of multiple storage systems 100 and uses the collections of information to train the learning process 325 to learn write patterns associated with devices 140 that have been incorrectly omitted from a consistency group 200.

Figure 7:
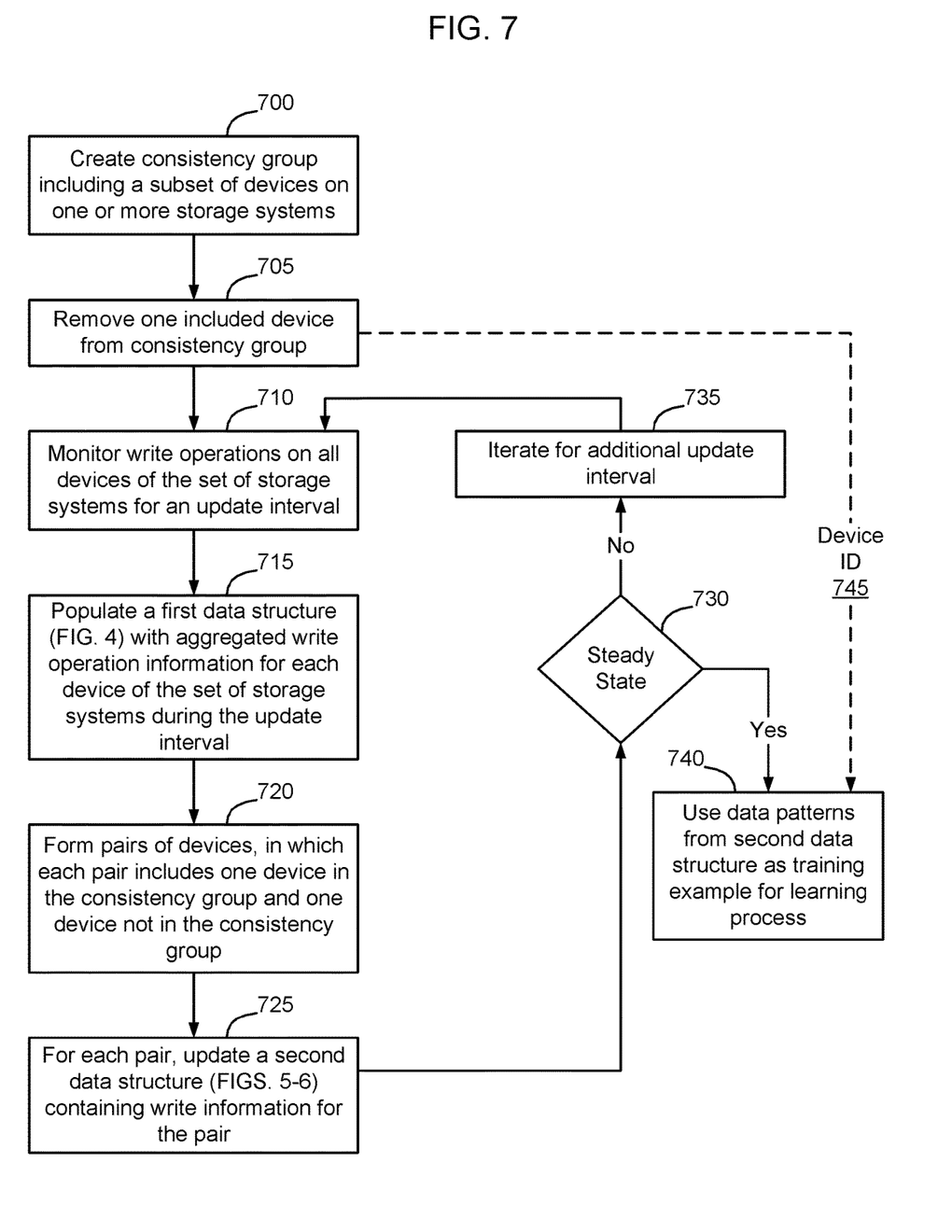
FIG. 7 is a flow chart of a method of creating training examples and using the training examples to train a learning process to identify write patterns indicative of a device missing from a consistency group, according to some embodiments.

FIG. 7 is a flow chart of a method of creating a training example to be used to train a learning process 325 to identify write patterns indicative of a device 140 missing from a consistency group 200, according to some embodiments.

As shown in FIG. 7, in some embodiments a consistency group 200 is created which includes a subset of devices 140 on one or more storage systems (block 700). The consistency group 200, at this stage, is intentionally created to include all required devices 140.

One of the required devices 140 is then removed from the consistency group 200 (block 705). By removing one of the required devices 140, it is possible to monitor the write dependencies using the data structures described above in connection with FIGS. 4-6, to create a training example for the learning process 325. Although the description will refer to "removing" a device from a consistency group 200, in some embodiments the device is only constructively removed from the consistency group 200 by adding the identity of the device that is to be "removed" to the class of devices that are not included in the consistency group 200, without actually removing the device 140 from the consistency group 200. This has the advantage of enabling training examples to be created using live customer data access operations on deployed storage systems, without affecting the integrity of the protection afforded to the customer data. Likewise, multiple training examples may be created from the same set of customer data, by processing the collected write data multiple times, each time with a different device constructively "removed" from the consistency group.

Accordingly, as shown in FIG. 7, after removing one of the required devices 140, write operations on all devices 140 of the set of storage systems is monitored, for example using device monitor 305 and device activity data structure 310 (block 710). Where the consistency group 200 is implemented over devices 140 on two storage systems, as shown in FIG. 2, the devices 140 of both storage systems are monitored. Where the consistency group 200 is implemented over a larger set of storage systems 100, for example on a group of four storage systems, the devices 140 of all four storage systems are monitored at block 710. Devices that are both inside the consistency group and devices that are outside of the consistency group are all monitored in block 710.

At block 715, a first data structure is populated with aggregated write operation information for each device 140 of the set of storage systems during an update interval. In some embodiments, the number of write operations on each device 140 is counted during the interval, but the size of the write operations is not monitored. In some embodiments, the first data structure is a device activity data structure 310, such as the device activity data structure 310 shown in FIG. 4. Other data structures may likewise be used and the device activity data structure 310 shown in FIG. 4 is merely an example. Similarly, the length of time of the update interval may vary, depending on the implementation.

At block 720, pairs of devices 140 are formed, in which each pair of devices 140 includes one device 140 that is inside the consistency group 200 and one device 140 that is not in the consistency group 200. The pairs of devices 140 are added as entries in a second data structure (block 725), such as the device pairing data structure 320 shown in FIGS. 5-6. Other data structures may likewise be used and the device pairing data structure 320 shown in FIGS. 5-6 is merely an example.

Write patterns are observed over a set of monitoring intervals to enable write operation patterns to develop within the entries of the second data structure. For example, if the monitoring intervals are 5 minutes in length, write operations on the set of devices 140 may be monitored for multiple monitoring intervals, to enable write operation patterns to develop within the entries of the second data structure. Since one of the devices that should have been part of the consistency group was removed in block 705, the write patterns that develop are indicative of a consistency group that has a missing device. Example write operation patterns, as described above in connection with FIGS. 5-6, may be a high correspondence between write operations on the device 140 that was removed from the consistency group 200 and one or more devices 140 that remained in the consistency group 200. Likewise, a consistent ratio of a number of writes on the removed device and one or more of the devices that is included in the consistency group 200 may indicate a pattern of dependent write operations.

In some embodiments, the write operation patterns of the second data structure are monitored over a number of monitoring intervals and a determination is made at block 730 if the write patterns have reached a steady state. If the write operation patterns are continuing to develop (a determination of NO at block 730), then the process iterates for additional update intervals (block 735). Once the write patterns have stabilized (a determination of YES at block 730), the second data structure contains information describing the write patterns between a set of devices 140 that are part of a consistency group 200 and a device 140 that should have been included in the consistency group 200 but was removed at block 705. These write patterns are able to be used as a training example or testing example to train the learning process 325 (block 740).

In some embodiments, the identity of the device 140 that was removed in block 705 is stored, and only the data patterns associated with devices 140 within the second data structure that reference the removed device 140 are used to look for write patterns that describe the write dependence between the devices 140 that remain in the consistency group 200 and the missing device. For example, rather than looking at all devices 140 that are outside of the consistency group 200, in some embodiments the consistency group integrity application 300 accesses rows 500 of the device pairing data structure 320 that include the device ID 615 of the device 140 that was removed in block 705, and uses those patterns as a training example. In some embodiments, the ID for the removed device is provided as part of the training example, as shown by dashed arrow 745.

Figure 8:
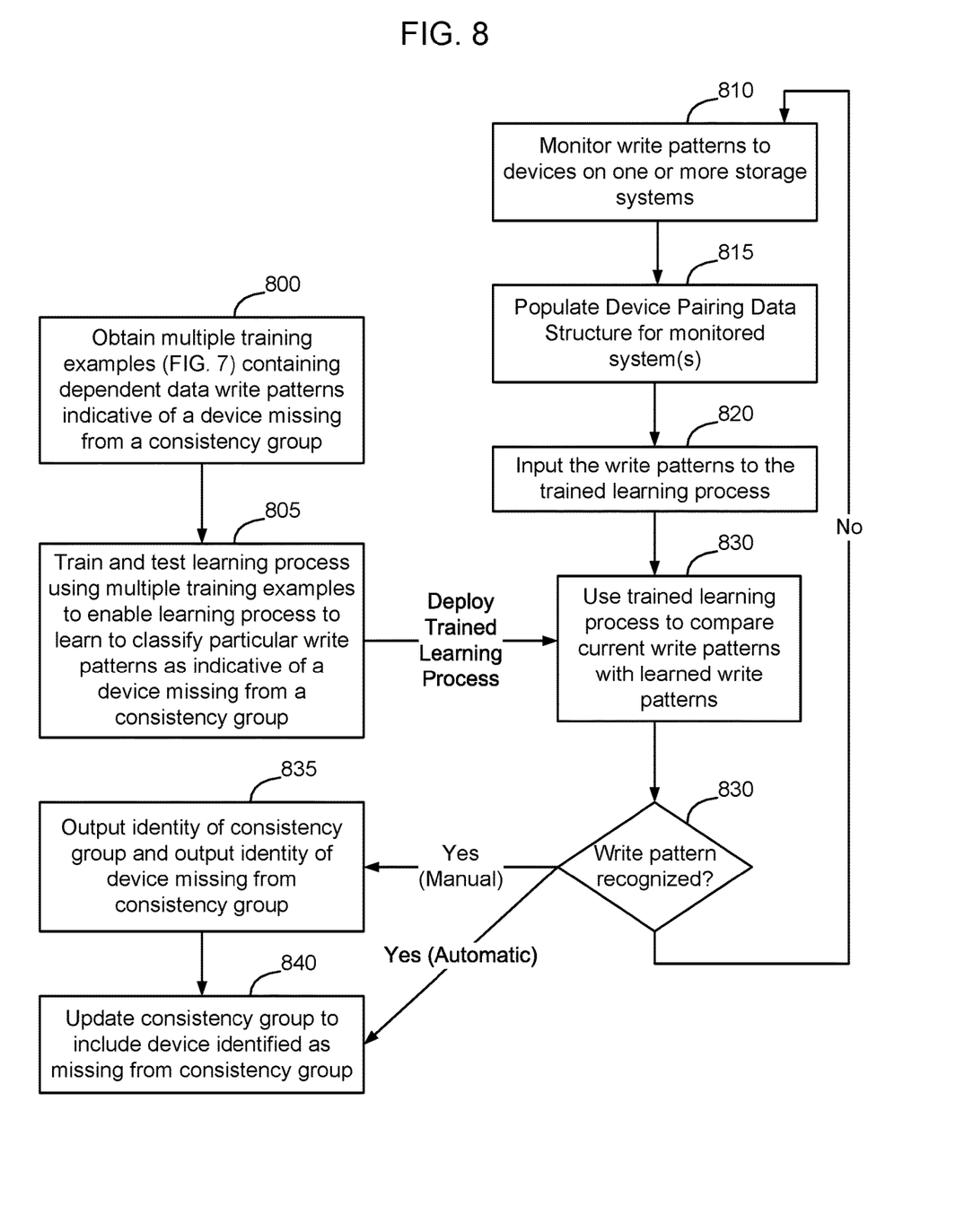
FIG. 8 is a flow chart of a method of using the training examples created using the process of FIG. 7 to train a learning process to identify write patterns indicative of a device missing from a consistency group, and using the deployed trained learning process to identify devices that are possibly missing from a consistency group, according to some embodiments.

FIG. 8 is a flow chart of a method of training a learning process 325 to identify write patterns indicative of a device 140 missing from a consistency group 200, and using the deployed trained learning process 325 to identify devices 140 that are possibly missing from a consistency group 200, according to some embodiments.

In some embodiments, the process shown in FIG. 7 is iterated multiple times with different consistency groups 200 and with different missing devices 140 to generate a large number of training examples. As noted above, the same storage system write data can be used with different constructively removed devices (block 705) and processed multiple times to create multiple training examples using the same storage system write data.

Once a large number of training examples correlating data write patterns indicative of a device 140 missing from a consistency group 200 are obtained (block 800), the examples are used to train a learning process 325. In some embodiments, multiple training examples are used to enable the learning process 325 to learn to classify particular write patterns as indicative of a device 140 missing from a consistency group 200.

In some embodiments, the learning process 325 is a supervised learning process configured to implement a classification process that is trained to identify a device 140 as missing from a consistency group 200. On other embodiments, the learning process 325 is a supervised learning process configured to implement a regression learning process that is trained to learn a regression between an independent variable (write patterns) and a dependent variable (percentage probability that a device should be included in a consistency group), to enable the learning process 325 to output a probability that a particular device 140 should be included in a consistency group 200 when presented with a particular write pattern.

As shown in FIG. 8, once the learning process 325 is trained, the learning process 325 is deployed and used to monitor write patterns of devices 140 that are included in a consistency group 200 and devices 140 that are not included in the consistency group 200. Specifically, as shown in FIG. 8, at block 810 the consistency group integrity application 300 monitors write patterns of devices 140 of a set of storage systems on which a consistency group 200 has been defined. In some embodiments, the device activity data structure 310 and device pairing data structure 320 described herein are used to establish write patterns for each consistency group 200 (block 815). By looking for write patterns using the same data structures that were used to train the learning function, it is possible to create write patterns in a manner similar to the manner in which the training examples were created to train the learning process 325.

In some embodiments, the device pairing data structure 320 created for the consistency group 200 is provided as input to the deployed trained learning process 325 and the deployed trained learning process 325 scans the rows 500 of the device pairing data structure 320 for the consistency group 200 looking for write patterns indicative that a device 140 should be included in the consistency group 200 (block 825). As noted above, example write patterns may indicate the presence of dependent write operations on the omitted device, which would indicate that the omitted device 140 should be included in the consistency group 200.

The trained learning process 325 looks for recognized write patterns (block 830). In some embodiments, if the deployed trained learning process 325 does not detect a recognized write pattern with a sufficiently strong correlation (a determination of NO at block 830) the process continues to monitor write patterns to determine if write patterns with sufficiently strong correlation develop over time. Optionally, write pattern observations may cease after a certain period of time once it is certain that there are no omitted devices 140 that should have been included in a consistency group 200.

If a write pattern is recognized that indicates the likelihood of a required device 140 being omitted from a consistency group 200 (a determination of YES at block 830), the manner in which the consistency group integrity application 300 operates will depend on whether manual intervention is required or whether automatic changes to the consistency group 200 are allowed. In a manual mode of operation, the consistency group integrity application 300 outputs an identity of a consistency group 200 and the identity of the device 140 that was determined to likely need to be added to the consistency group 200 (block 835). This information may be provided to a system administrator or other person, for example in the form of a text message or user interface alarm message, to enable the person to take corrective action. For example, the person can then approve entry of the device 140 to the consistency group 200 (block 840). In an automatic mode of operation, the consistency group integrity application 300 automatically adds the device 140 to the consistency group 200 (block 840) and, optionally, notifies the system administrator of the action that was taken.

Although separate data structures are shown in FIGS. 4-6 to illustrate how aspects of the data can be processed to form training examples, it should be understood that a common data structure may be used to store the data shown in FIGS. 4-6.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of identifying a logical storage device as missing from a consistency group, comprising:
    defining a consistency group containing a first plurality of included logical storage devices, each of the plurality of included logical storage devices residing on a respective storage system in a set of one or more storage systems, the one or more storage systems also containing a second plurality of non-included logical storage devices that are not included in the consistency group;
    creating sets of pairs of logical storage devices, each set of pairs of logical storage devices including a plurality of pairs formed between a respective one of the first plurality of included logical storage devices and every one of the second plurality of non-included logical storage devices, wherein each pair of logical storage devices includes one included logical storage device and one non-included logical storage device;
    monitoring write patterns associated with the write operations on each of the first plurality of included logical storage devices during a plurality of monitoring intervals;
    monitoring write patterns associated with the write operations on each of the second plurality of non-included logical storage devices during the plurality of monitoring intervals;
    comparing the write patterns of each pair of logical storage devices to compare write patterns of each of the first plurality of included logical storage devices with the write patterns of every one of the second plurality of non-included logical storage devices during each of the plurality of monitoring intervals; and
    at the end of the plurality of monitoring intervals, determining from the compared write patterns that coordinated write activity between one of the non-included logical storage devices and one or more of the included logical storage devices indicates that the one of the non-included logical storage devices is missing from the consistency group.

2. The method of claim 1, wherein the step of comparing the write patterns comprises populating a device activity data structure with aggregated write information on each of the included logical storage devices and each of the non-included logical storage devices over a first of the monitoring intervals.

3. The method of claim 2, further comprising replacing the aggregated write information in the device activity data structure in successive monitoring intervals.

4. The method of claim 2, further comprising populating a device pairing data structure with aggregated write information from the device activity data structure, the device pairing data structure having an entry for each pair of logical storage devices.

5. The method of claim 4, further comprising updating the device pairing data structure in successive monitoring intervals.

6. The method of claim 5, wherein each entry further includes a coordinated write probability percentage comparing a percentage of monitoring intervals in which both respective logical storage devices had write activity with monitoring intervals in which only one of the respective logical storage devices had write activity.

7. The method of claim 6, wherein the step of determining, from the compared write patterns, that the one of the non-included logical storage devices is identified as missing from the consistency group, comprises determining that a coordinated write probability percentage of one of the entries of the device pairing data structure is above a threshold.

8. The method of claim 5, wherein at least some of the entries further include ratios of numbers of update operations to respective logical storage devices.

9. The method of claim 8, wherein the step of determining, from the compared write patterns, that one of the non-included logical storage devices is identified as missing from the consistency group, comprises determining that one of the ratios of numbers of update operations occurs with a frequency above a threshold.

10. A method of training a learning process to monitor write operations on logical storage volumes to identifying a logical storage device missing from a consistency group, the method comprising:
    generating a set of training examples, each training example being created by:
        defining a consistency group containing a first plurality of included logical storage devices, each of the plurality of included logical storage devices residing on a respective storage system in a set of one or more storage systems, the one or more storage systems also containing a second plurality of non-included logical storage devices that are not included in the consistency group;
        selecting one of the included logical storage devices;
        creating a set of pairs of logical storage devices, the set of pairs of logical storage devices including pairs formed between the selected included logical storage device and every one of the non-selected included logical storage devices, wherein each pair of logical storage devices includes the selected included logical storage device and one of the non-selected included logical storage devices;
        monitoring write patterns associated with the write operations on each of the non-selected included logical storage devices during a plurality of monitoring intervals;

monitoring write patterns associated with the write operations on the selected included logical storage device during the plurality of monitoring intervals;

comparing the write patterns of each pair of logical storage devices to compare write patterns of each of the non-selected included logical storage devices with the write patterns of the selected included logical storage device during each of the plurality of monitoring intervals; and at the end of the plurality of monitoring intervals, determining from the compared write patterns coordinated write pattern activity between the selected included logical storage device and non-selected included logical storage devices;

and using the set of training examples to train the learning process to identify coordinated write pattern activity indicating a non-included device is missing from a consistency group.

11. The method of claim 10, wherein the step of comparing the write patterns comprises populating a device activity data structure with aggregated write information on the selected included logical storage device and each of the non-selected included logical storage devices over a first of the monitoring intervals.

12. The method of claim 11, further comprising replacing the aggregated write information in the device activity data structure in successive monitoring intervals.

13. The method of claim 11, further comprising populating a device pairing data structure with aggregated write information from the device activity data structure, the device pairing data structure having an entry for each pair of logical storage devices.

14. The method of claim 13, further comprising updating the device pairing data structure in successive monitoring intervals.

15. The method of claim 14, wherein each entry further includes a coordinated write probability percentage comparing a percentage of monitoring intervals in which both respective logical storage devices had write activity with monitoring intervals in which only one of the respective logical storage devices had write activity.

16. The method of claim 14, wherein at least some of the entries further include ratios of numbers of update operations to respective logical storage devices.

17. The method of claim 10, wherein the learning process is a classification process that is trained to identify a device as missing from a consistency group.

18. The method of claim 17, wherein the learning process is a supervised learning process configured to implement a regression learning process that is trained to learn a regression between write patterns and a percentage probability that a device should be included in a consistency group.

19. An apparatus for identifying a device missing from a consistency group, comprising:

at least one processor and at least one memory configured to implement a trained learning process, the trained learning process being trained using a set of training examples and used to identify write patterns associated with coordinated write activity between logical devices indicating that a logical storage device is missing from a consistency group, wherein each training example is created by:

defining a consistency group containing a first plurality of included logical storage devices, each of the plurality of included logical storage devices residing on a respective storage system in a set of one or more storage systems, the one or more storage systems also containing a second plurality of non-included logical storage devices that are not included in the consistency group;

selecting one of the included logical storage devices;

creating a set of pairs of logical storage devices, the set of pairs of logical storage devices including pairs formed between the selected included logical storage device and every one of the non-selected included logical storage devices, wherein each pair of logical storage devices includes the selected included logical storage device and one of the non-selected included logical storage devices;

monitoring write patterns associated with the write operations on each of the non-selected included logical storage devices during a plurality of monitoring intervals;

monitoring write patterns associated with the write operations on the selected one of the included logical storage devices during the plurality of monitoring intervals;

comparing the write patterns of each pair of logical storage devices to compare write patterns of each of the non-selected included logical storage devices with the write patterns of the selected included logical storage device during each of the plurality of monitoring intervals; and at the end of the plurality of monitoring intervals, determining from the compared write patterns coordinated write pattern activity between the selected included logical storage device and non-selected included logical storage devices.

* * * * *